(12) United States Patent
Oh

(10) Patent No.: US 8,199,458 B2
(45) Date of Patent: Jun. 12, 2012

(54) SURFACE MOUNTING TYPE HIGH VOLTAGE CAPACITOR WITH ARRAY STRUCTURE

(76) Inventor: Young Joo Oh, Seoul (KR)

( * ) Notice: Subject to any disclaimer, the term of this patent is extended or adjusted under 35 U.S.C. 154(b) by 544 days.

(21) Appl. No.: 12/385,426

(22) Filed: Apr. 8, 2009

(65) Prior Publication Data

US 2010/0238604 A1 Sep. 23, 2010

(30) Foreign Application Priority Data

Mar. 19, 2009 (KR) .......................... 10-2009-0023601

(51) Int. Cl.
- *H01G 4/38* (2006.01)
- *H01G 4/005* (2006.01)
- *H01G 4/06* (2006.01)

(52) U.S. Cl. ..................... 361/330; 361/303; 361/321.1

(58) Field of Classification Search .................. 361/303, 361/311, 328, 330, 329, 320, 322, 321.6, 361/321.5, 306.1, 306.2

See application file for complete search history.

(56) References Cited

U.S. PATENT DOCUMENTS

| | | | |
|---|---|---|---|
| 942,620 A * | 12/1909 | Dearlove ....................... | 370/283 |
| 3,714,530 A * | 1/1973 | Wells et al. ................... | 361/330 |
| 4,090,231 A * | 5/1978 | Millard et al. ................ | 361/529 |
| 4,370,698 A * | 1/1983 | Sasaki ........................... | 361/330 |
| 4,855,866 A * | 8/1989 | Imamura et al. ............. | 361/306.2 |
| 4,866,566 A * | 9/1989 | Nishiyama ................... | 361/306.2 |
| 4,870,541 A * | 9/1989 | Cole .............................. | 361/328 |
| 4,942,496 A | 7/1990 | Arakawa et al. | |
| 4,959,505 A * | 9/1990 | Ott ................................. | 174/546 |
| 5,023,578 A * | 6/1991 | Kaneko et al. ................ | 333/185 |
| 5,920,453 A * | 7/1999 | Evans et al. ................... | 361/303 |
| 6,856,516 B2 * | 2/2005 | Ernsberger et al. ........... | 361/763 |
| 6,975,501 B1 * | 12/2005 | Baniecki et al. .............. | 361/311 |
| 6,998,308 B2 * | 2/2006 | Ooi et al. ....................... | 438/253 |
| 7,710,710 B2 * | 5/2010 | Brunner et al. ............. | 361/306.3 |
| 7,898,795 B2 * | 3/2011 | Kasuga et al. ................ | 361/523 |
| 2009/0109597 A1 * | 4/2009 | Anthony .................... | 361/306.3 |

FOREIGN PATENT DOCUMENTS

| | | | | |
|---|---|---|---|---|
| JP | 55041774 | A | * | 3/1980 |
| JP | 02246308 | A | * | 10/1990 |
| JP | 06232003 | A | * | 8/1994 |
| JP | 06283384 | A | * | 10/1994 |

* cited by examiner

*Primary Examiner* — Eric Thomas
*Assistant Examiner* — David M Sinclair
(74) *Attorney, Agent, or Firm* — Rosenberg, Klein & Lee

(57) ABSTRACT

Provided is a surface mounting type high voltage ceramic capacitor with an array structure that may form a plurality of capacitors in an array structure to thereby simultaneously mount the plurality of capacitors on a printed circuit board, and thus may reduce a work procedure and enhance a work productivity. The surface mounting type high voltage ceramic capacitor with an array structure, may include: a ceramic member 11; a common electrode member 12 being formed on one surface of the ceramic member 11; a plurality of individual electrode members 13 being arranged on another surface of the ceramic member 11; a common lead terminal 14 being connected to the common electrode member 12; a plurality of individual lead terminals 15 being connected to the plurality of individual electrode members 13, respectively, to face the common lead terminal 14; and a molding member 16 sealing the ceramic member 11, the common electrode member 12, and the plurality of individual electrode members 13.

22 Claims, 9 Drawing Sheets

SURFACE MOUNTING TYPE HIGH VOLTAGE CAPACITOR WITH ARRAY STRUCTURE

CROSS-REFERENCE TO RELATED APPLICATION

This application claims the benefit of Korean Patent Application No. 10-2009-0023601, filed on Mar. 19, 2009, in the Korean Intellectual Property Office, the disclosure of which is incorporated herein by reference.

BACKGROUND OF THE INVENTION

1. Field of the Invention

The present invention relates to a surface mounting type high voltage ceramic capacitor with an array structure, and more particularly, to a surface mounting type high voltage ceramic capacitor with an array structure that may form a plurality of capacitors in an array structure to thereby simultaneously mount the plurality of capacitors on a printed circuit board, and thus may reduce a work procedure and enhance a work productivity.

2. Description of the Related Art

Hereinafter, a conventional surface mounting type ceramic capacitor will be described with reference to the accompanying drawing.

FIG. 1 is a cross-sectional view of a conventional surface mounting type ceramic capacitor 1.

As shown in FIG. 1, the conventional surface mounted ceramic capacitor 1 is a single type, and includes a ceramic disc 1a, a plurality of electrode members 1b, a plurality of lead terminals 1c, and a resin 1d. Here, the resin 1d may use any one of epoxy, phenol, and epoxy molded compound.

In the conventional surface mounting type ceramic capacitor 1, the electrode member 1b is formed on each of both sides of the ceramic disc 1a. The lead terminal 1c is provided to the electrode member 1b to be connected to an external electronic part (not shown). The resin 1d seals the ceramic disc 1a to protect the capacitor 1. When mounting a plurality of capacitors on a printed circuit board (not shown) in a circuit requiring the plurality of capacitors, the above conventional capacitor 1 may be mounted alone and thus it may require a long work time.

When mounting a plurality of capacitors through a single mounting operation as in a conventional surface mounting type ceramic capacitor, a productivity of a mounting work may be deteriorated.

SUMMARY OF THE INVENTION

An aspect of the present invention provides a surface mounting type high voltage ceramic capacitor with an array structure that may simultaneously mount a plurality of capacitors on a printed circuit board by forming the plurality of capacitors in the array structure and thereby may reduce a work procedure and enhance a work productivity.

Another aspect of the present invention also provides a surface mounting type high voltage ceramic capacitor with an array structure that may form a plurality of capacitors in an array structure and thereby may reduce a mounting area and increase a mounting intensity when mounting the plurality of capacitors on a printed circuit board.

Another aspect of the present invention also provides a surface mounting type high voltage ceramic capacitor with an array structure that may form a plurality of capacitors in an array structure and enhance the structure of a ceramic member and a common electrode member and thereby may reliably operate in a high voltage environment, a high frequency environment, and a high humid environment.

According to a first embodiment of the present invention, there is provided a surface mounting type high voltage ceramic capacitor with an array structure, including: a ceramic member; a common electrode member being formed on one surface of the ceramic member; a plurality of individual electrode members being arranged on another surface of the ceramic member; a common lead terminal being connected to the common electrode member; a plurality of individual lead terminals being connected to the plurality of individual electrode members, respectively, to face the common lead terminal; and a molding member sealing the ceramic member, the common electrode member, and the plurality of individual electrode members.

According to a second embodiment of the present invention, there is provided a surface mounting type high voltage ceramic capacitor with an array structure, including: a ceramic member; a common electrode member being formed on one surface of the ceramic member; a plurality of individual electrode members being arranged on another surface of the ceramic member; a plurality of common lead terminals being connected to the common electrode member to face each other in a first direction; and a plurality of individual lead terminals being connected to the plurality of individual electrode members, respectively, to face each other in a second direction.

According to a third embodiment of the present invention, there is provided a surface mounting type high voltage ceramic capacitor with an array structure, including: a ceramic member; a common electrode member being formed on one surface of the ceramic member; a plurality of individual electrode members being arranged on another surface of the ceramic member; an insulating substrate being provided on the ceramic member to be connected to the plurality of individual electrode members, and including a plurality of conductive land patterns being formed on its one surface and another surface; a plurality of common connection terminals being connected to the common electrode member and the plurality of conductive land patterns of the insulating substrate to face each other in a first direction; a plurality of ball lead terminals being connected to the plurality of conductive land patterns formed on the other surface of the insulating substrate, respectively; and a molding member sealing the ceramic member, the common electrode member, and the plurality of individual electrode members, and including a plurality of insertion holes so that the plurality of ball lead terminals are inserted into the plurality of insertion holes, respectively, to be connected to the insulating substrate.

BRIEF DESCRIPTION OF THE DRAWINGS

The above and/or other aspects of the present invention will become apparent and more readily appreciated from the following description of the exemplary embodiments, taken in conjunction with the accompanying drawings in which.

DETAILED DESCRIPTION OF THE INVENTION

Hereinafter, embodiments of a piezoelectric substrate according to the present invention will be described with reference to the accompanying drawings.

Embodiment 1

A first embodiment of the present invention relates to a surface mounting type high voltage ceramic capacitor with an array structure in a form of a dual inline package (DIP) or a small outline package (SOP). Hereinafter, the first embodiment will be described with reference to the accompanying drawings.

Figure 1:
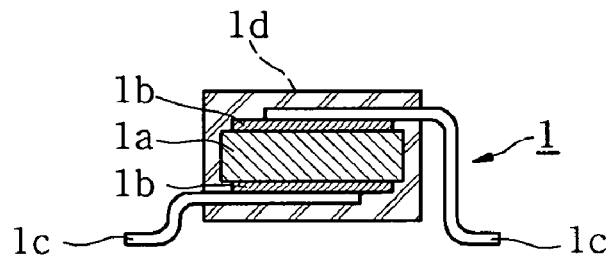
FIG. 1 is a cross-sectional view of a conventional surface mounting type ceramic capacitor.
Figure 2:
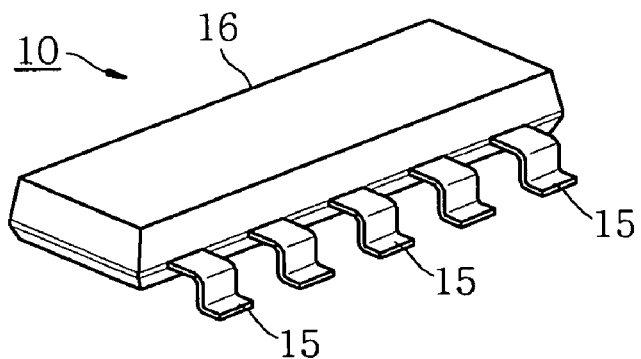
FIG. 2 is a perspective view of a surface mounting type high voltage ceramic capacitor with an array structure according to a first embodiment of the present invention.
Figure 3:
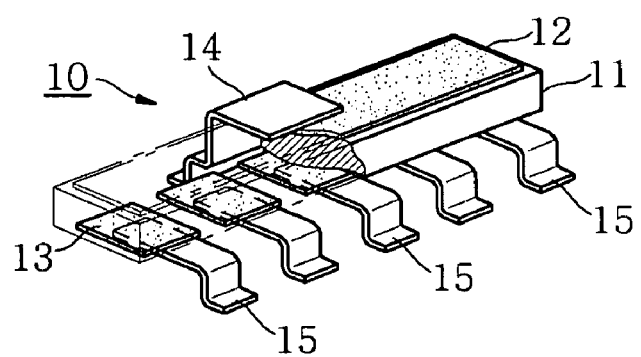
FIG. 3 is a partially cross-sectioned perspective view of the surface mounting type high voltage ceramic capacitor with the array structure shown in FIG. 2.
Figure 4:
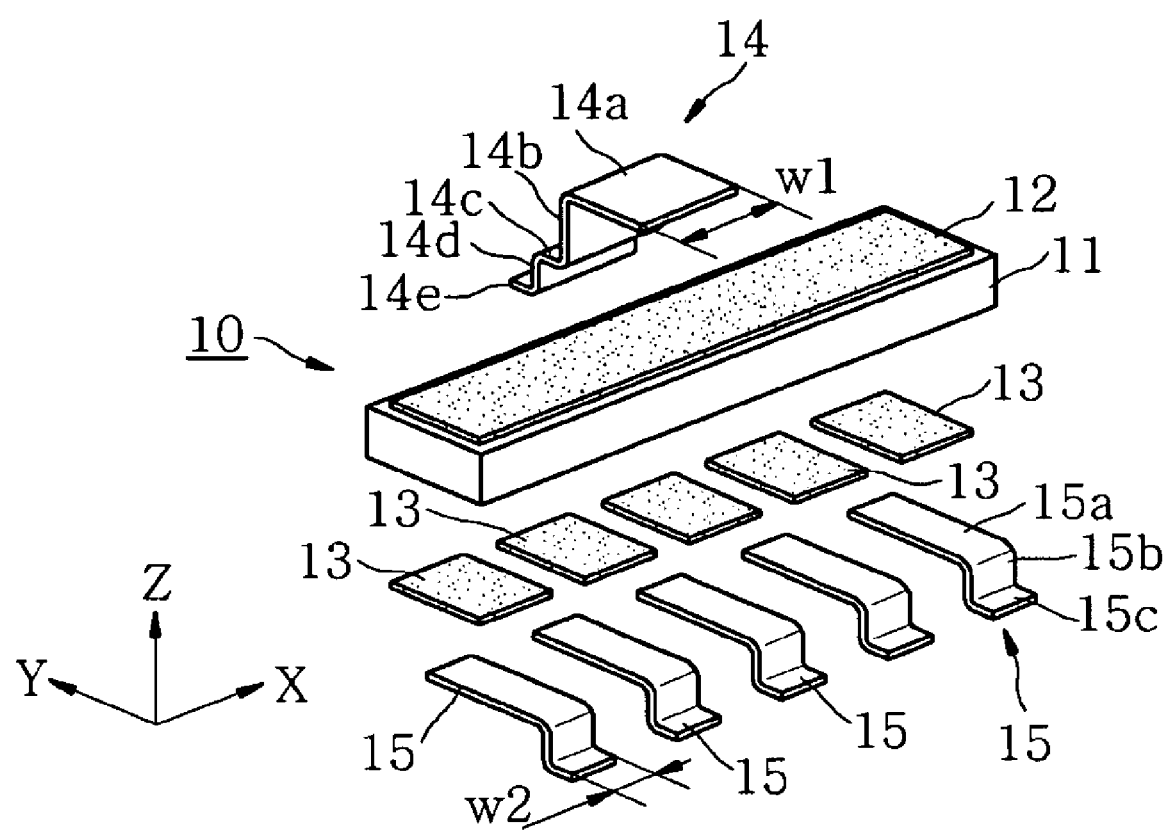
FIG. 4 is an exploded perspective view of the surface mounting type high voltage ceramic capacitor with the array structure shown in FIG. 3.

FIG. 2 is a perspective view of a surface mounting type high voltage ceramic capacitor 10 with an array structure according to a first embodiment of the present invention, FIG. 3 is a partially cross-sectioned perspective view of the surface mounting type high voltage ceramic capacitor 10 with the array structure shown in FIG. 2, and FIG. 4 is an exploded perspective view of the surface mounting type high voltage ceramic capacitor 10 with the array structure shown in FIG. 3.

Referring to FIGS. 2 through 4, the surface mounting type high voltage ceramic capacitor 10 with the array structure according to the first embodiment of the present invention may include a ceramic member 11, a common electrode member 12, a plurality of individual electrode members 13, a common lead terminal 14, a plurality of individual lead terminals 15, and a molding member 16.

In order to form a plurality of capacitors in an array type using a dielectric substance of the surface mounting type high voltage ceramic capacitor 10, the ceramic member 11 may be extended into a first direction, X axis. The common electrode member 12 may be formed on one surface of the ceramic member 11, that is, on the top surface of the ceramic member 11. The plurality of individual electrode members 13 may be arranged on another surface of the ceramic member 11, that is, on the bottom surface of the ceramic member 11. The common lead terminal 14 may be electrically connected to the common electrode member 12. The plurality of individual lead terminals 15 may be electrically connected to the plurality of individual electrode members, respectively, to face the common lead terminal 14. The molding member 16 may seal the ceramic member 11, the common electrode member 12, and the plurality of individual electrode members 13.

The first embodiment of the present invention constructed as above is to manufacture the surface mounting type high voltage ceramic capacitor 10 in the form of the DIP or the SOP. Hereinafter, constituent elements thereof will be described in detail.

Figure 6A:
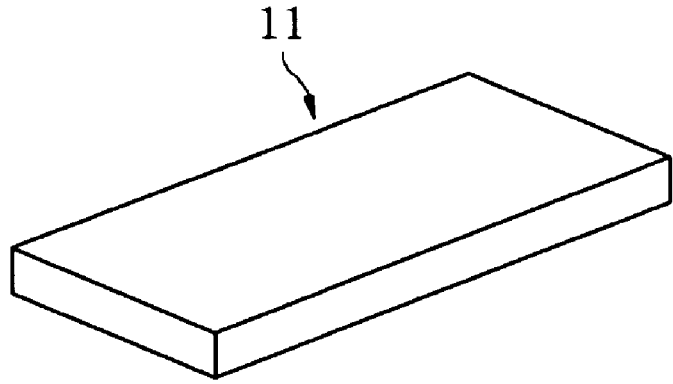
FIGS. 6A to 6E are perspective views illustrating various embodiments of a ceramic member shown in FIG. 5B.
Figure 6B:
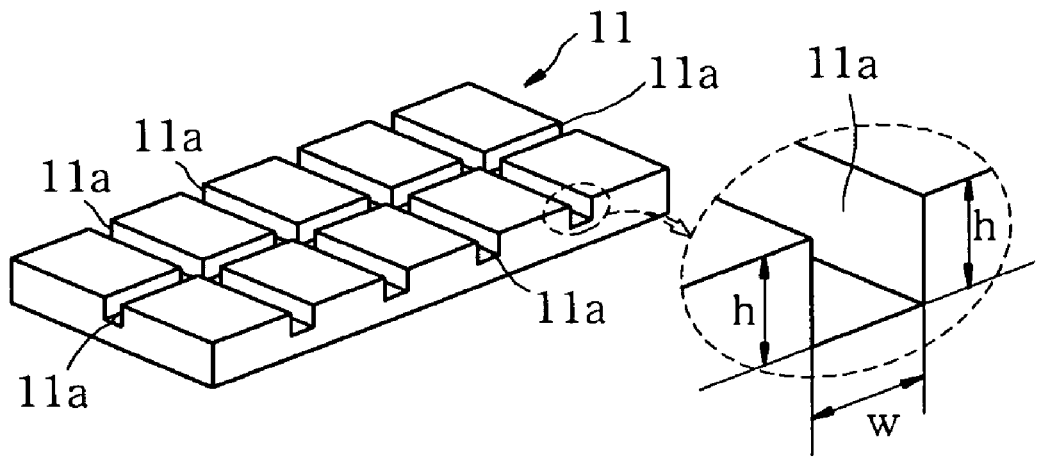

The ceramic member 11 may use any one of $BaTiO_3$, $BaO-Nd_2O_3-TiO_2$, $MgO-TiO_2$, and $CaTiO_3-SrTiO_3$ oxides, and a dielectric constant of the oxides may be from about 10 to about 20,000. As shown in FIG. 6A, a plurality of separation grooves 11a may be formed on the other surface of the ceramic member 11 in order to secure an insulating distance between the plurality of individual electrode members 13. In order to increase an aspect ratio of the separating groove 11a, a height of the separation groove 11a may be 0.3 folds through 0.7 folds of a width thereof. The plurality of grooves 11a may extend a distance between the plurality of individual electrode members 13 by a distance h+h+w. Through this, it is possible to prevent a surface discharge according to non-securing of the insulating distance and to thereby decrease flashover. Accordingly, the surface mounting type high voltage ceramic capacitor 10 may reliably operate in the high voltage environment.

Figure 6C:
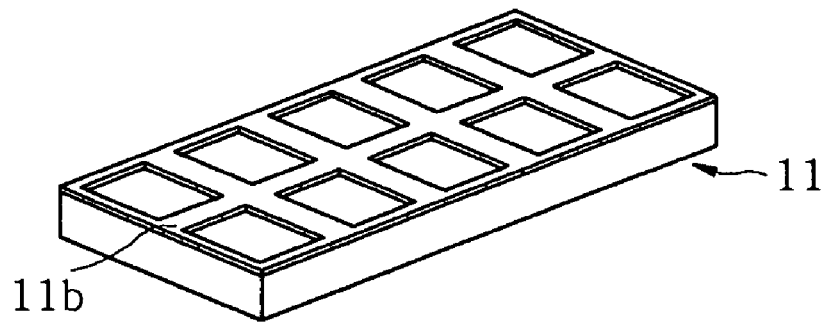

As shown in FIG. 6C, an insulating member 11b having an insulating property greater than an insulating property of the ceramic member 11 may be further provided on the other surface of the ceramic member 11. The insulating member 11b may be formed on the ceramic member 11 to expose the plurality of individual electrode members 13. A glass frit or a polymer insulating material may be applied for the insulating member 11b. When the glass frit is applied for the insulating member 11b, the glass frit may be formed by sintering any one of $SiO_2-Li_2O_3-B_2O_3$ and $Li_2O_3-B_2O_3-V_2O_5$ in the temperature of about 400° C. to about 700° C. and by performing spray coating or screen printing. When the polymer insulating material is applied for the insulating member, the polymer insulating material may be formed by spray-coating and hardening any one of epoxy, polyimide, silicon resin, and polyester resin.

Figure 6D:
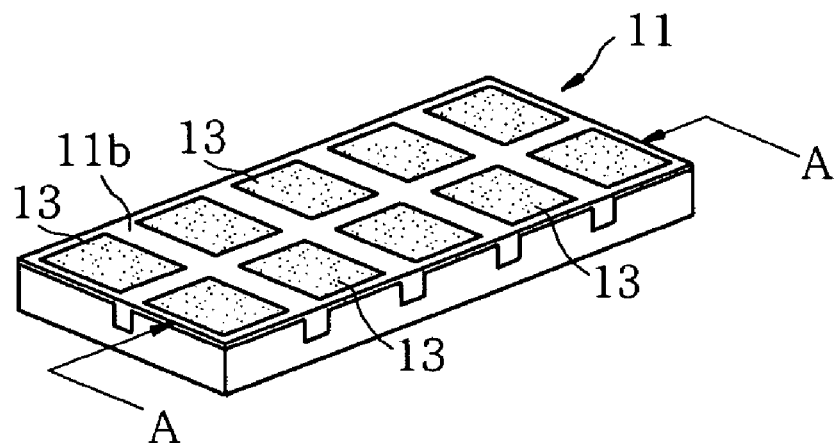
Figure 6E:
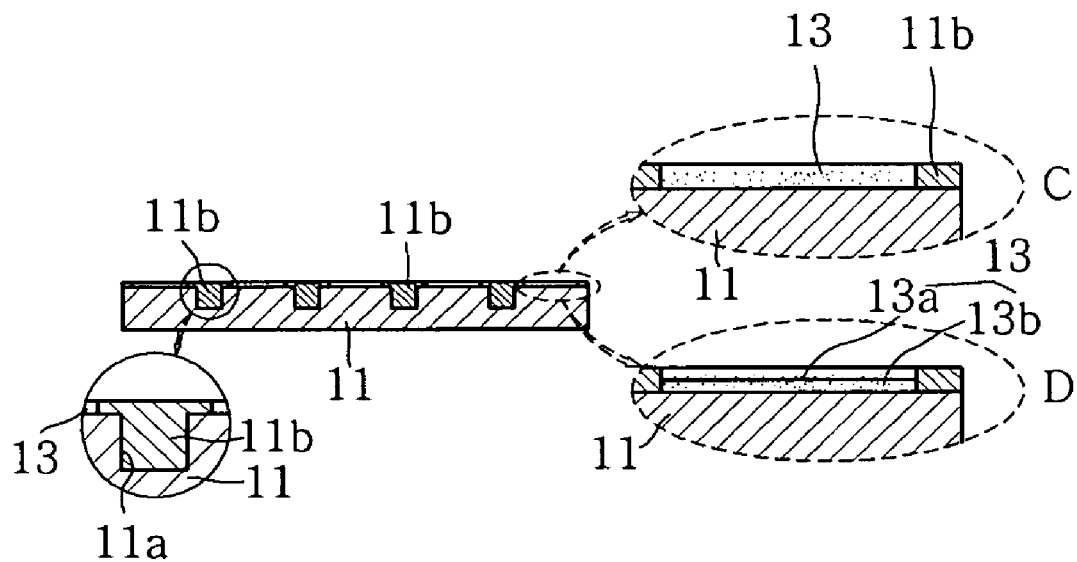

As shown in FIGS. 6D and 6E, the plurality of separation grooves 11a and the insulating member 11b may be simultaneously formed on the ceramic member 11. Specifically, when the plurality of separation grooves 11a are formed on the ceramic member 11, as shown in FIG. 6A, using a photo-etching process, the insulating member 11b may be provided to expose the plurality of individual electrode members 13 on the other surface of the ceramic member 11 and to seal the plurality of separation grooves 11a. Here, FIG. 6E is a cross-sectional view cutting along a line A-A of FIG. 6D. FIGS. 6A to 6D are perspective views from a Z-axis direction with respect to the ceramic member 11.

Figure 7A:
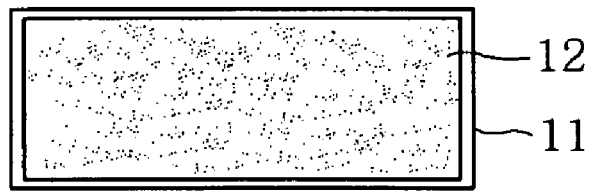
FIGS. 7A to 7D are plan views illustrating various embodiments of a common electrode member shown in FIG. 5B.
Figure 7B:
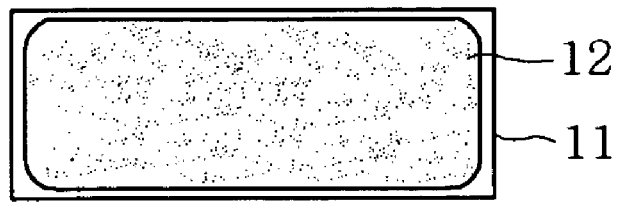
Figure 7C:
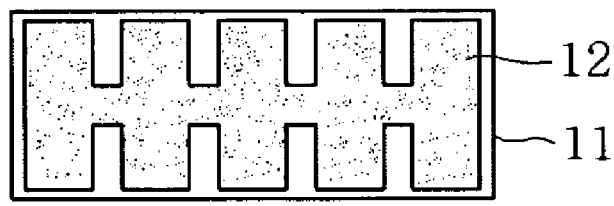
Figure 7D:
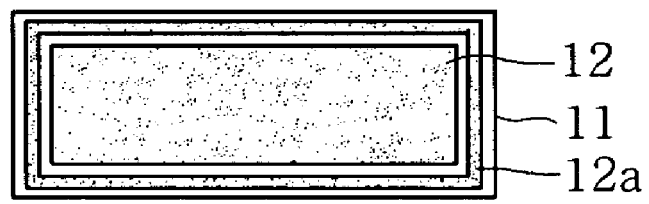

As shown in FIG. 7D, a guide ring pattern electrode member 12a may be formed along an outer circumference of the common electrode member 12 in order to maintain a uniformity of an electric field. As shown in FIGS. 7A to 7C, the common electrode member 12 may be formed in any one of a single square pattern, a single edge-removed square pattern, and a pattern where a plurality of H-shaped patterns are connected to each other. The common electrode member 12 may be formed of any one of Cu, Ag, Cu—Ni, Cu—Zn, and Ag—Zn.

Figure 8A:
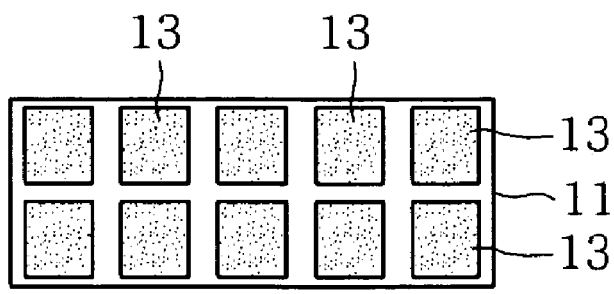
FIGS. 8A and 8B are plan views illustrating various embodiments of an individual electrode member shown in FIG. 5B.
Figure 8B:
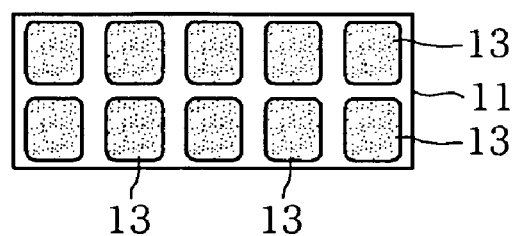

As shown in FIGS. 8A and 8B, each of the individual electrode members 13 may be formed in a square pattern or an edge-removed square pattern. Also, each of the individual electrode members 13 may be formed by photo-etching, screen-printing, and sintering any one of Ag, Cu, Ni, Ag—Zn, and Ag—Cu. Here, FIGS. 8A and 8B are plan views from a Z-axis direction with respect to the ceramic member 11. Together with the ceramic member 11 and the common electrode member 12, the plurality of individual electrode members 13 may constitute a plurality of capacitors C1, C2, ..., Cn shown in FIG. 10. The plurality of individual electrode members 13 constituting the plurality of capacitors C1, C2, ..., Cn may be provided in a single layer or in a plurality of layers as shown in enlarged views (C) and (D) of FIG. 6E.

Each of the individual electrode members 13 consisting of the plurality of layers may include a first individual electrode layer 13a and a second individual electrode layer 13b. The first individual electrode layer 13a may be formed on the ceramic member 11, and may be formed by depositing any one of Cu, Ag, Ni, and Sn. Also, the second individual electrode layer 13b may be formed on the first individual electrode layer 13a and may be formed by plating any one of Cu, Ni, and Ag.

Figure 10:
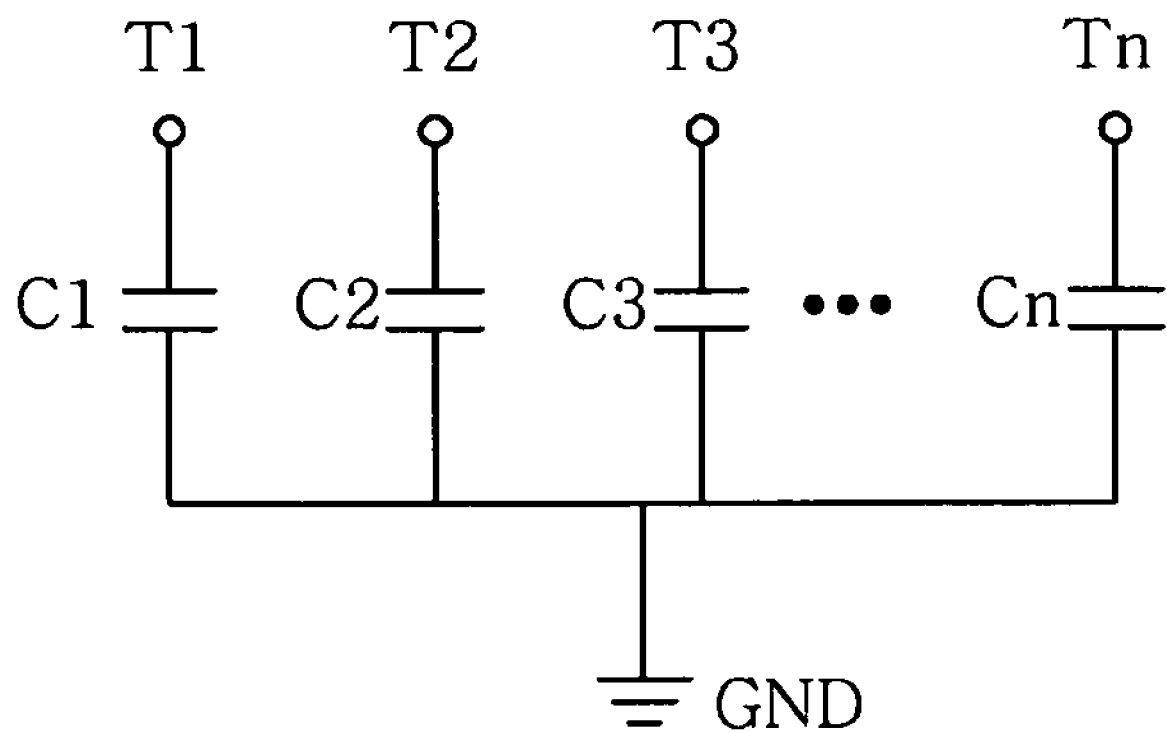
FIG. 10 is an equivalent circuit diagram of a surface mounting type high voltage ceramic capacitor with an array structure according to the present invention.

The common lead terminal 14 may be connected to a ground GND of FIG. 10 to face the plurality of individual lead terminals 15. Through this, the surface mounting type high voltage ceramic capacitor 10 according to the first embodiment of the present invention may be manufactured in the form of the DIP. A width w1 of the common lead terminal 14 may be formed to be greater than a width w2 of the individual lead terminal 15 as shown in FIG. 4. The common lead terminal 14 may include a plurality of horizontal lead frames 14a, 14c, and 14e and a plurality of vertical lead frames 14b and 14d.

The plurality of horizontal lead frames 14a, 14c, and 14e may be separated from each other, and the plurality of vertical lead terminals 14b and 14d may be connected between the plurality of horizontal lead frames 14a, 14c, and 14e to thereby support the plurality of horizontal lead frames 14a, 14c, and 14e. The plurality of horizontal lead frames 14a, 14c, and 14e may be provided in a Z-axis direction. The plurality of horizontal lead frames 14a, 14c, and 14e and the plurality of vertical lead frames 14b and 14d may use any one of Cu, Ag, Fe, Cu—Zn, and Fe—Ni. The plurality of vertical lead frames 14b and 14d may be integrally formed with the plurality of horizontal lead frames 14a, 14c, and 14e. The surface mounting type high voltage ceramic capacitor 10 according to the first embodiment of the present invention may be manufactured in the form of the SOP by forming any one of the horizontal lead frames 14a, 14c, and 14e, for example, the horizontal lead frame 14e to be relatively shorter.

The plurality of individual lead terminals 15 may constitute a plurality of terminals T1, T2, ..., Tn shown in FIG. 10. When the plurality of individual electrode members 13 are provided in a line, the plurality of individual lead terminals 15 may correspond to the plurality of individual electrode members 13, respectively. Specifically, the individual lead terminals 15 may be provided to correspond to a number of the individual electrode members 13. Each of the individual lead terminals 15 may include a plurality of horizontal lead frames 15a and 15c that are separated from each other, and a vertical lead frame 15b. Each of the horizontal lead frames 15a and 15c may be connected to the individual electrode member 13, or to another electronic part (not shown) in a circuit. The surface mounting type high voltage ceramic capacitor 10 according to the first embodiment of the present invention may be manufactured in the form of the SOP by forming the horizontal lead frame 15c connected to the electronic part to be relatively shorter. The vertical lead frame 15b may be provided in the Z-axis direction and be connected between the plurality of horizontal lead frames 15a and 15c to support the plurality of horizontal lead frames 15a and 15c. The horizontal lead frames 15a and 15c, and the vertical lead frame 15b may use any one of Cu, Ag, Fe, Cu—Zn, and Fe—Ni, and the vertical lead frame 15b may be integrally formed with the plurality of horizontal lead frames 15a and 15c.

The molding member 16 may use any one of epoxy, phenol, polyimide, and epoxy molded compound.

Embodiment 2

A second embodiment of the present invention relates to a surface mounting type high voltage ceramic capacitor with an array structure in a form of a quad flat package (QFP). Hereinafter, the second embodiment will be described with reference to the accompanying drawings.

Figure 5A:
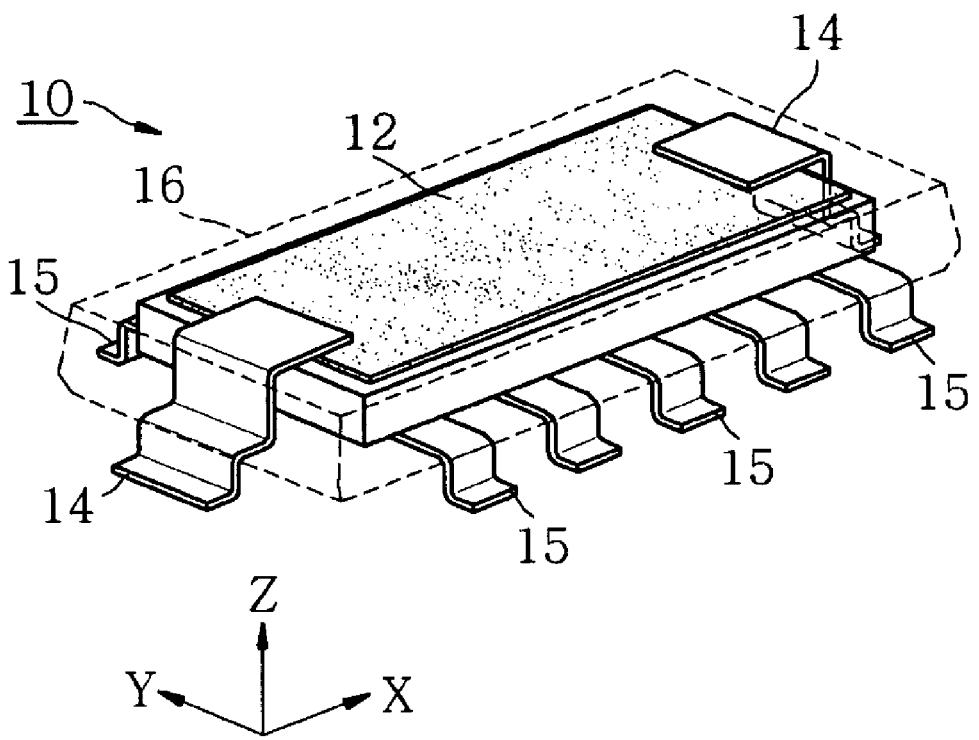
FIGS. 5A and 5B are perspective views illustrating a surface mounting type high voltage ceramic capacitor with an array structure according to a second embodiment of the present invention.
Figure 5B:
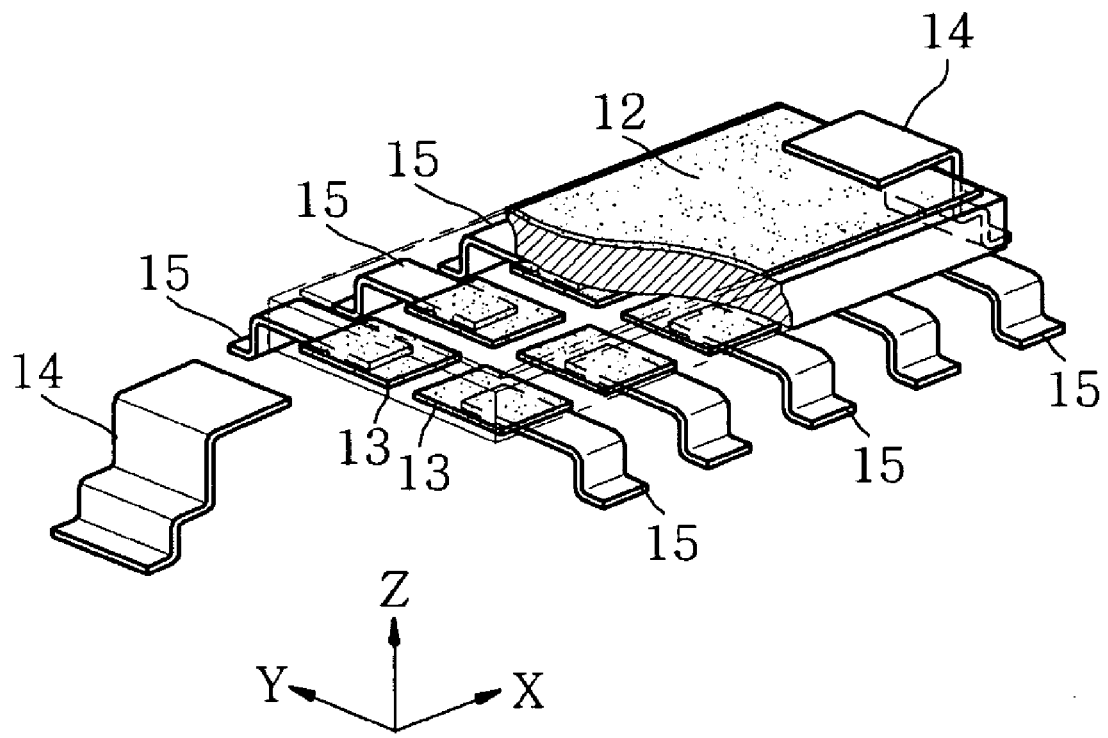

FIGS. 5A and 5B are perspective views illustrating a surface mounting type high voltage ceramic capacitor 10 with an array structure according to a second embodiment of the present invention.

Referring to FIGS. 5A and 5B, the surface mounting type high voltage ceramic capacitor 10 with the array structure according to the second embodiment of the present invention may include a ceramic member 11, a common electrode member 12, a plurality of individual electrode members 13, a plurality of common lead terminals 14, and a plurality of individual lead terminals 15.

The ceramic member 11, the common electrode member 12, and the plurality of individual electrode members 13 will be the same as the aforementioned first embodiment and thus further detailed description related thereto will be omitted here. In the second embodiment, the plurality of individual electrode members 13 may be arranged in two rows. The plurality of common lead terminals 14 may be connected to the common electrode member 12 to face each other in a first direction, that is, X axis. The plurality of individual lead terminals 15 may be connected to the plurality of individual electrode members 13, arranged in two rows, respectively, to face each other in a second direction, that is, Y axis. Here, the first direction, X axis, and the second direction, Y axis, are orthogonal to each other. The ceramic member 11 may further include a molding member 16. The molding member 16 may seal the ceramic member 11, the common electrode member 12, and the plurality of individual electrode members 13.

By providing the plurality of common lead terminals 14 to face each other in the first direction, X axis, and by providing the plurality of individual lead terminals 15 to face each other in the second direction, Y axis, the surface mounting type high voltage ceramic capacitor 10 according to the second embodiment of the present invention may be manufactured in the form of the QFP.

Embodiment 3

A third embodiment of the present invention relates to a surface mounting type high voltage ceramic capacitor with an array structure in a form of a land grid array (LGA) or a ball grid array (BGA). Hereinafter, the third embodiment will be described with reference to the accompanying drawings.

Figure 9A:
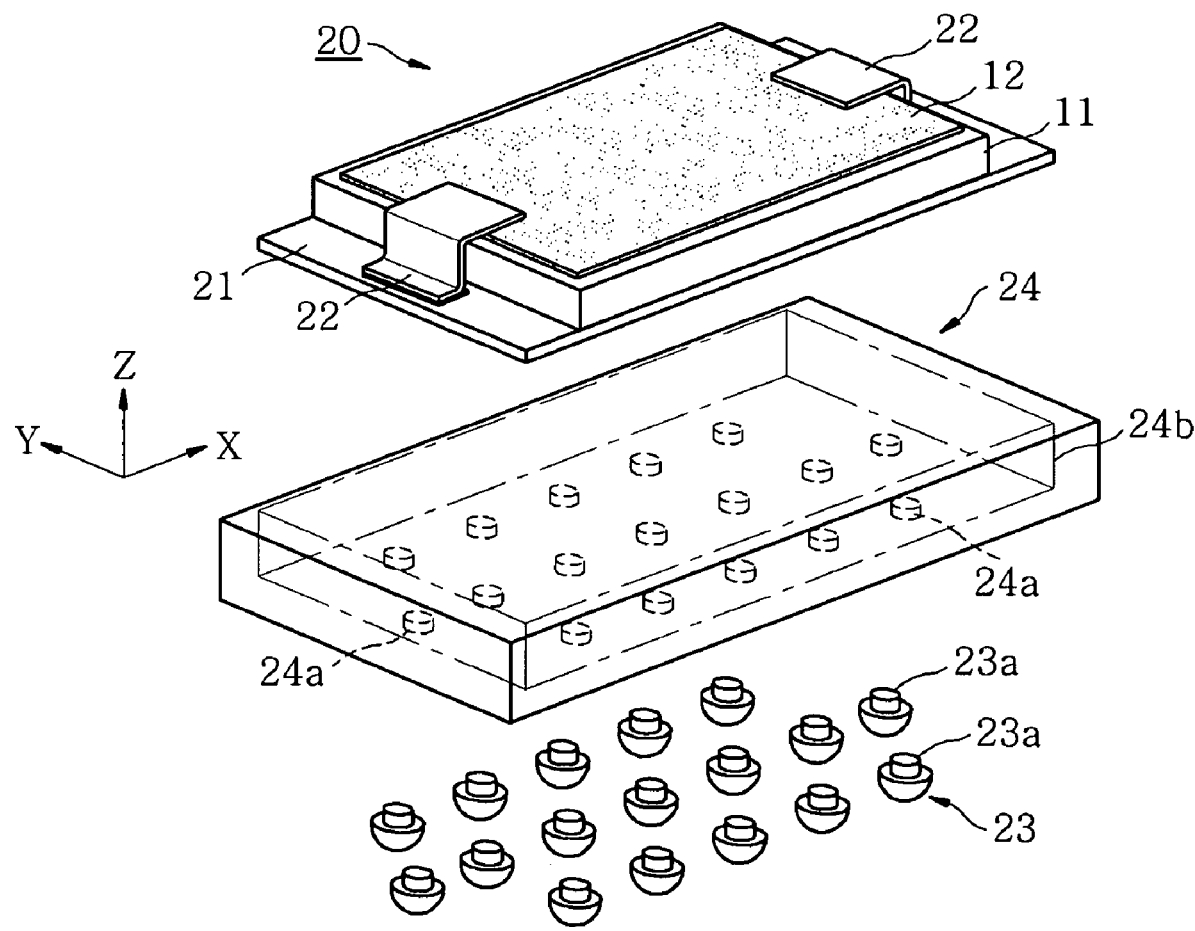
FIGS. 9A and 9B are exploded perspective views of a surface mounting type high voltage ceramic capacitor with an array structure according to a third embodiment of the present invention.
Figure 9B:
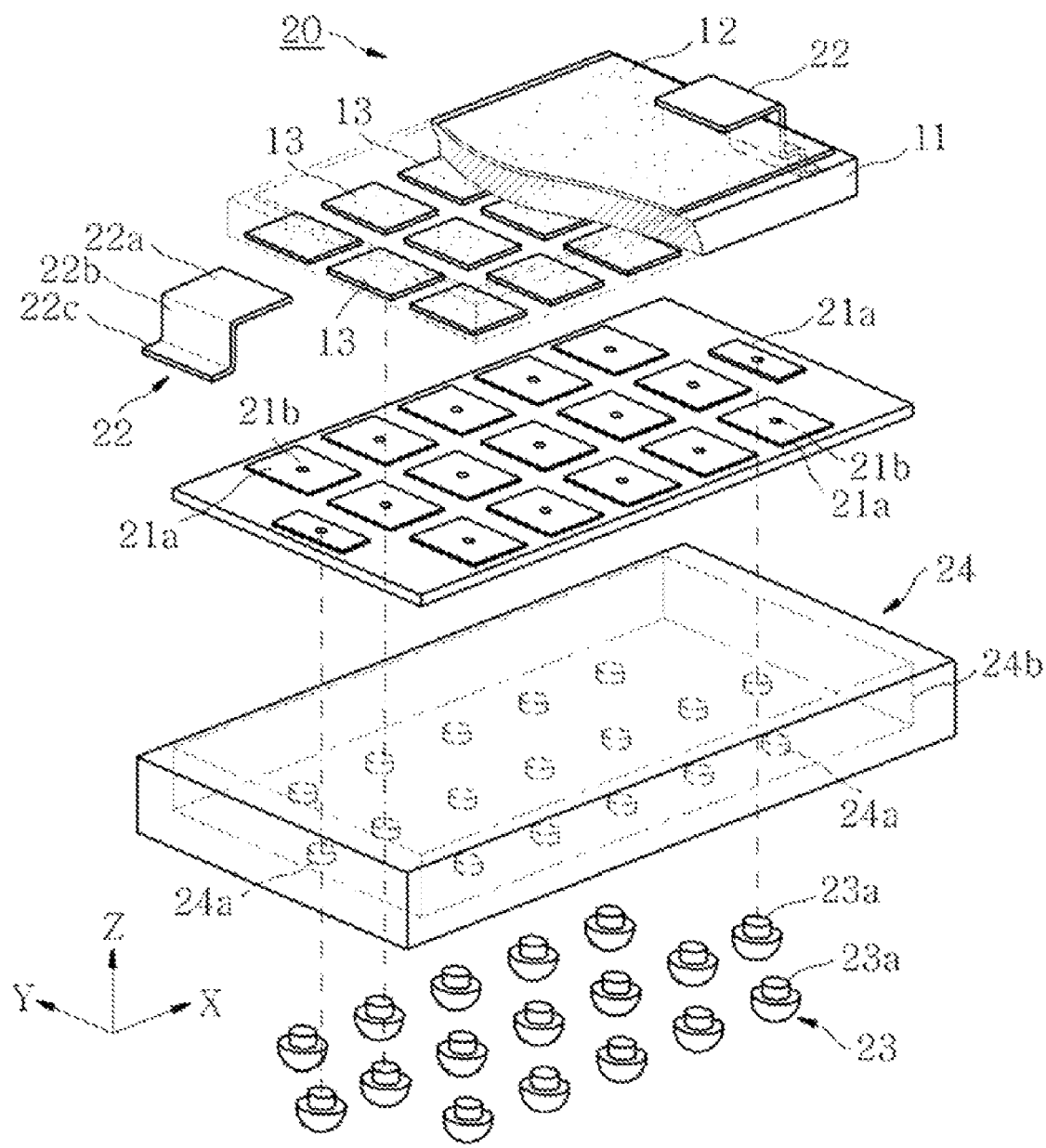

FIGS. 9A and 9B are exploded perspective views of a surface mounting type high voltage ceramic capacitor 20 with an array structure according to a third embodiment of the present invention.

Referring to FIGS. 9A and 9B, the mounted surface high voltage ceramic capacitor 20 according to the third embodiment of the present invention may include a ceramic member 11, a common electrode member 12, a plurality of individual electrode members 13, an insulating substrate 21, a plurality of common connection terminals 22, a plurality of ball lead terminals 23, and a molding member 24.

The surface mounting type high voltage ceramic capacitor 20 according to the third embodiment of the present invention is to manufacture an LGA or a BGA package. The ceramic member 11, the common electrode member 12, and the plurality of individual electrode members 13 will be the same as the aforementioned first embodiment and second embodiment, and thus further detailed description related thereto will be omitted here. In the third embodiment, the plurality of individual electrode members 13 may be arranged in a plurality of rows in a first direction, X axis, or in a second direction, Y axis.

The insulating substrate 21 may be provided on the ceramic member 11 to be connected to the plurality of individual electrode members 13. A plurality of conductive land patterns 21a may be formed on one surface and another surface of the insulating substrate 21. The plurality of conductive land patterns 21a formed on the one surface of the insulating substrate 21 may be connected to the plurality of individual electrode members 13, respectively. A via-hole 21b may be formed in the insulating substrate 21 so that conductive land patterns 21a formed on the one surface and the other surface of the insulating substrate 21 may be connected to each other. Here, when one surface of the insulating substrate 21 corresponds to the top surface and the other surface of the insulating substrate 21 corresponds to the bottom surface, a conductive land pattern (not shown) formed on the bottom surface may be formed to be the same as the conductive land pattern 21a formed on the top surface.

The plurality of common connection terminals 22 may be connected to the common electrode member 12 and the plurality of conductive land patterns 21a of the insulating substrate 21 to face each other in the first direction. Each of the plurality of common connection terminals 22 may include a plurality of horizontal lead frames 22a and 22c, and a vertical lead frame 22b. The plurality of horizontal lead frames 22a and 22c may be separated from each other. One of the horizontal lead frames 22a and 22c may be connected to the common electrode member 12, and another thereof may be connected to the conductive land pattern 21a of the insulating substrate 21. The vertical lead frame 22b may be connected between the plurality of horizontal lead frames 22a and 22c to support the plurality of horizontal lead frames 22a and 22c.

The plurality of ball lead terminals 23 may be connected to the plurality of conductive land patterns 21a formed on the other surface of the insulating substrate 21, respectively. A protruded member 23a may be provided to be inserted into an insertion hole 24a formed in the molding member 24. The molding member 24 may seal the ceramic member 11, the common electrode member 12, and the plurality of individual electrode members 13. A plurality of insertion holes 24a may be formed so that the plurality of ball lead terminals 23 may be inserted into the plurality of insertion holes 24a, respectively, to be connected to the insulating substrate 21. The molding member 24 may be formed by arranging the plurality of insertion holes 24a on the bottom of a space 24b where the ceramic member 11 is molded. The insertion holes 24a may be formed using molding when forming the molding member 24.

As described above, the surface mounting type high voltage ceramic capacitors 10 and 20 with the array structure according to the present invention may be manufactured into various types of packages such as a DIP, an SOP, a QFP, an LGA package, and a BGA package. Accordingly, when mounting a plurality of capacitors on a printed circuit board in a circuit requiring a thinness of a high frequency power and an enhanced mounting reliability, and also requiring the plurality of capacitors to adjust a plurality of power circuits and impedance, it is possible to reduce a work time and to obtain an enhanced reliability.

According to embodiments of the present invention, there is provided a surface mounting type high voltage ceramic capacitor with an array structure that may form a plurality of capacitors in an array structure and thereby may enhance a work productivity and may also reduce a mounting area and increase a mounting density when mounting the plurality of capacitors on a printed circuit board. Also, it is possible to provide a reliability of operation even in a high voltage, a high frequency, and a high humidity environment by forming a separation groove or an insulating member in a ceramic member and by forming a guide ring pattern in a common electrode member.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A surface mounting type high voltage ceramic capacitor with an array structure, comprising:
   a ceramic member;
   a common electrode member being formed on a first surface of the ceramic member;
   a plurality of individual electrode members being arranged on a second surface of the ceramic member;
   a common lead terminal being connected to the common electrode member;
   a plurality of individual lead terminals being connected to the plurality of individual electrode members, respectively, to face the common lead terminal;
   a molding member sealing the ceramic member, the common electrode member, and the plurality of individual electrode members; and
   an insulating member being provided on the second surface of the ceramic member, and the insulating member being formed on the ceramic member to expose the plurality of individual electrode members, the insulating member being a glass frit, and the glass frit being formed by sintering any one of $SiO_2$—$Li_2O_3$—$B_2O_3$ and $Li_2O_3$—$B_2O_3$—$V_2O_5$ in the temperature of about 400° C. to about 700° C. and by performing spray coating or screen printing.

2. The surface mounting type high voltage ceramic capacitor of claim 1, wherein the ceramic member uses any one of $BaTiO_3$, $BaO$—$Nd_2O_3$—$TiO_2$, $MgO$—$TiO_2$, and $CaTiO_3$—$SrTiO_3$ oxides, and a dielectric constant of the oxides is from about 10 to about 20,000.

3. The surface mounting type high voltage ceramic capacitor of claim 1, wherein a plurality of separation grooves are formed on the second surface of the ceramic member to secure an insulating distance between the plurality of individual electrode members.

4. The surface mounting type high voltage ceramic capacitor of claim 3, wherein a height of the separation groove is 0.3 folds through 0.7 folds of a width thereof.

5. The surface mounting type high voltage ceramic capacitor of claim 1, wherein a guide ring pattern electrode member is formed along an outer circumference of the common electrode member to maintain a uniformity of an electric field.

6. The surface mounting type high voltage ceramic capacitor of claim 1, wherein the common electrode member is formed in any one of a single square pattern, a single edge-removed square pattern, and a pattern where a plurality of H-shaped patterns are connected to each other.

7. The surface mounting type high voltage ceramic capacitor of claim 1, wherein the common electrode member is formed of any one of Cu, Ag, Cu—Ni, Cu—Zn, and Ag—Zn.

8. The surface mounting type high voltage ceramic capacitor of claim 1, wherein each of the individual electrode members is formed in a square pattern or an edge-removed square pattern.

9. The surface mounting type high voltage ceramic capacitor of claim 1, wherein each of the individual electrode members is formed by photo-etching, screen-printing, and sintering any one of Ag, Cu, Ni, Ag—Zn, and Ag—Cu.

10. The surface mounting type high voltage ceramic capacitor of claim 1, wherein each of the individual electrode members comprises:
    a first individual electrode layer being formed on the ceramic member; and
    a second individual electrode layer being formed on the first individual electrode layer, and
    the first individual electrode layer is formed by depositing any one of Cu, Ag, Ni, and Sn, and the second individual electrode layer is formed by plating any one of Cu, Ni, and Ag.

11. The surface mounting type high voltage ceramic capacitor of claim 1, wherein the common lead terminal comprises:
    a plurality of horizontal lead frames being separated from each other; and
    a plurality of vertical lead frames being connected between the plurality of horizontal frames to support the plurality of horizontal lead frames, and
    the plurality of horizontal lead frames and the plurality of vertical lead frames use any one of Cu, Ag, Fe, Cu—Zn, and Fe—Ni, and the plurality of vertical lead frames are integrally formed with the plurality of horizontal lead frames.

12. The surface mounting type high voltage ceramic capacitor of claim 1, wherein a width of the common lead terminal is formed to be greater than a width of the individual lead terminal.

13. The surface mounting type high voltage ceramic capacitor of claim 1, wherein each of the individual lead terminals comprises:
    a plurality of horizontal lead frames being separated from each other; and
    a vertical lead frame being connected between the plurality of horizontal lead frames to support the plurality of horizontal lead frames, and
    the plurality of horizontal lead frames and the vertical lead frame uses any one of Cu, Ag, Fe, Cu—Zn, and Fe—Ni, and the vertical lead frame is integrally formed with the plurality of horizontal lead frames.

14. The surface mounting type high voltage ceramic capacitor of claim 1, wherein the molding member uses any one of epoxy, phenol, polyimide, and epoxy molded compound.

15. A surface mounting type high voltage ceramic capacitor with an array structure, comprising:
    a ceramic member;
    a common electrode member being formed on one surface of the ceramic member;
    a plurality of individual electrode members being arranged on another surface of the ceramic member;
    a plurality of common lead terminals being connected to the common electrode member to face each other in a first direction;
    a plurality of individual lead terminals being connected to the plurality of individual electrode members, respectively, to face each other in a second direction; and
    an insulating member being provided on the other surface of the ceramic member, and the insulating member being formed on the ceramic member to expose the plurality of individual electrode members; the insulating member being a glass frit, and the glass frit being formed by sintering any one of $SiO_7$—$Li_2O_3$—$B_2C_3$ and $Li_2O_3$—$B_2O_3$—$V_2O_5$ in the temperature of about 400° C. to about 700° C. and by performing spray coating or screen printing.

16. The surface mounting type high voltage ceramic capacitor of claim 15, wherein the first direction and the second direction are orthogonal to each other.

17. The surface mounting type high voltage ceramic capacitor of claim 15, wherein:
    the ceramic member further comprises a molding member, and
    the molding member seals the ceramic member, the common electrode member, and the plurality of individual electrode members.

18. A surface mounting type high voltage ceramic capacitor with an array structure, comprising:
    a ceramic member;
    a common electrode member being formed on one surface of the ceramic member;
    a plurality of individual electrode members being arranged on another surface of the ceramic member;
    an insulating substrate being provided on the ceramic member to be connected to the plurality of individual electrode members, and including a plurality of first conductive land patterns being formed on a first surface and a second surface of said insulating substrate, and a plurality of second conductive land patterns being formed on said first surface and said second surface of said insulating substrate, said insulating substrate being a glass flit, and said glass frit being formed by sintering any one of $SiO_2$—$Li_2O_3$—$B_2O_3$ and $Li_2O_3$—$B_2O_3$—$V_2O_5$ in a temperature of about 400° C. to about 700° C. and by performing spray coating or screen printing;
    a plurality of common connection terminals being connected to the common electrode member and the plurality of second conductive land patterns formed on the first surface of the insulating substrate to face each other in a first direction;
    a plurality of ball lead terminals being connected to the plurality of first and second conductive land patterns formed on the second surface of the insulating substrate, respectively; and a molding member sealing the ceramic member, the common electrode member, and the plurality of individual electrode members, and including a plurality of insertion holes so that the plurality of ball lead terminals are inserted into the plurality of insertion holes, respectively, connected to the plurality of first and second conductive land patterns formed on the second surface of said insulating substrate.

19. The surface mounting type high voltage ceramic capacitor of claim 18, wherein the plurality of first conductive land patterns formed on the first surface of the insulating substrate are connected to the plurality of individual electrode members, respectively.

20. The surface mounting type high voltage ceramic capacitor of claim 18, wherein a via-hole is formed in the insulating substrate so that the conductive land patterns formed on the first surface and the second surface of the insulating substrate are connected to each other.

21. The surface mounting type high voltage ceramic capacitor of claim 18, wherein each of the common connection terminals comprises:

a plurality of horizontal lead frames being separated from each other; and a vertical lead frame being connected between the plurality of horizontal lead frames to support the plurality of horizontal lead frames.

22. The surface mounting type high voltage ceramic capacitor of claim 18, wherein a protruded member is formed on each of the ball lead terminals to be inserted into each of the insertion holes formed in the molding member.

* * * * *